June 27, 1933.    H. F. SHINDEL    1,915,553
PIPE COUPLING
Filed Aug. 19, 1932

Harry F. Shindel  Inventor

By  [signature]

Attorney

Patented June 27, 1933

1,915,553

UNITED STATES PATENT OFFICE

HARRY F. SHINDEL, OF READING, PENNSYLVANIA, ASSIGNOR TO WILLSON PRODUCTS, INC., OF READING, PENNSYLVANIA, A CORPORATION OF PENNSYLVANIA

PIPE COUPLING

Application filed August 19, 1932. Serial No. 629,410.

My invention relates to pipe couplings in which one of the members is provided with a normally closed valve adapted to be opened in the act of coupling; and it consists in providing the cooperating coupling member with means for adjustably determining the extent of such opening as hereinafter fully set forth by reference to the accompanying drawing with the novel features clearly defined in the claims.

The valve-provided coupling member A as indicated is provided with an ordinary ball valve $a$ which is normally pressed by a spring $b$ against its seat in the inner plate $c$, so as to permit of its being opened by a fixed contact provided in the cooperating coupling member B; the coupling of the two members as shown, being effected with provision for breaking the same when desired, by means of a split-ring $d$ as fully set forth in my pending application Ser. No. 543,040 filed June 9, 1931.

Figure 1:
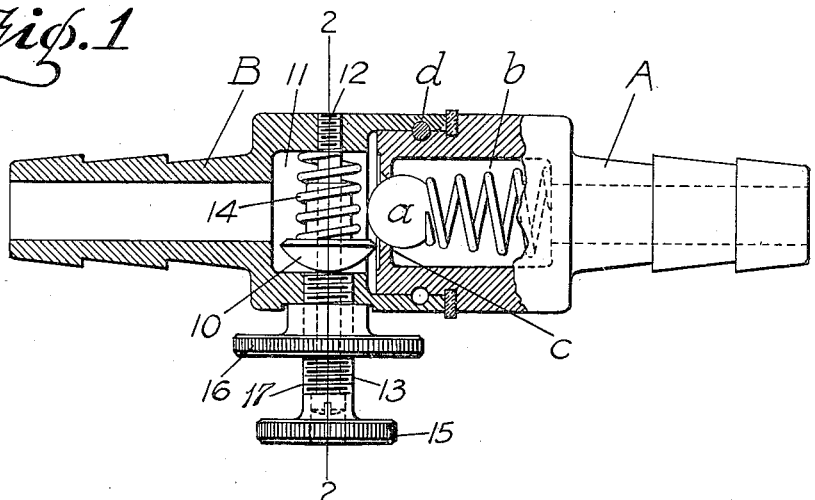
Fig. 1 is a longitudinal-section view of a coupling member embodying in preferred form my adjustable valve-opening means; shown in coupled connection with a valve-provided coupling member, and the adjustable valve-contacting device being illustrated as set in fully withdrawn position.
Figure 2:
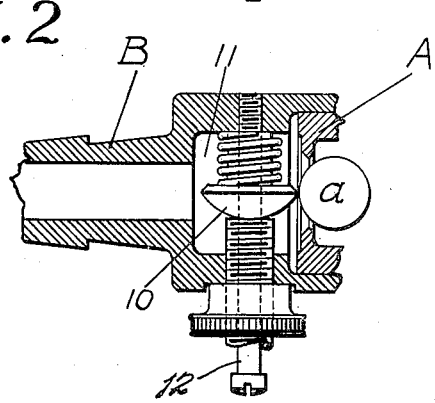
Fig. 2 is a separate fragmentary view of the improved coupling member, similar to Fig. 1, but indicating the valve-contacting device as set to fully open the valve.

The purpose of the present invention is to enable any desired opening of the valve $a$ to be automatically insured by the coupling together of the members,—so as to more or less throttle the normal flow of fluid therethrough,—as for instance of compressed air supplied to respirators. To this end I provide the coupling member B with an adjustable valve-contact device which is lockably settable therein so as to serve as a relatively fixed means for unseating the valve $a$ more or less as determined, when the members are operatively coupled. As fully shown in Figs. 1 and 2, this adjustable contact device consists of a disc 10, which is diametrally adjustable in the cylindrical chamber 11 of the member B and which is formed with a sleeve portion for mounting it on a supporting bar 12 extending transversely of chamber 11. A spring 14 mounted about bar 12 and the sleeve portion of disc 10 between the latter and the wall of chamber 11 urges the disc against the end of an adjusting screw 13 threadedly engaging an aperture in the chamber wall and which, also, is mounted upon bar 12. Screw 13 acts as a stop for controlling the position of disc 10 and is provided with an operating head 15 by means of which it may be set to adjustably position the disc transversely of chamber 11 so that the edge of the disc variably contacts the surface of the ball valve to effect a predetermined opening of valve $a$ on coupling of the members A and B, a knurled nut 16 being provided for locking the adjusting screw 13 against turning when valve contacting disc 10 has been set to a desired position. In the arrangement shown the supporting bar 12 extends exteriorly of chamber 11 and is provided with a screw-head cooperating with a shoulder 17 formed by a countersink at the end of the screw-mounting bore to limit the withdrawal of the screw end from chamber 11 and also to prevent inadvertent detachment of screw 13 from the coupling. Thus when the ball-contacting rim of said disc has been moved approximately into the axial plane of the coupling, the valve will be opened to its maximum, as indicated in Fig. 2; while any intermediate micro-adjustment thereof by means of the screw, very accurately varies the operating flow opening as desired, and is fixed in its setting by the lock nut.

The preferred construction above specifically described may obviously be modified without departing from the essentials of my invention as defined in the claims.

What I claim is:

1. In combination with a pipe coupling member having an axially movable valve normally seated therein; an axially engageable coupling member having a contact-receiving chamber, a diametrally arranged supporting bar extending through the wall of said chamber, and a spring-pressed valve-contacting sleeve adjustably carried by said bar and adapted to determinedly open said valve when the members are normally coupled.

2. In combination with a pipe fitting having an axially movable, normally seated, valve therein; an engageable fitting having a chamber; an adjustable valve contacting member in said chamber; a stop for controlling the position of said member in said chamber; and means for operating said stop to adjustably position said member for effecting a predetermined opening of said valve upon engagement of said fittings.

3. In combination with a pipe fitting having an axially movable, normally seated, valve therein; an engageable fitting having a chamber; an adjustable valve contacting member in said chamber; a stop for controlling the position of said member in said chamber; means urging said member against said stop; and means for operating said stop to adjustably position said member for effecting a predetermined opening of said valve upon engagement of said fittings.

4. In combination with a pipe fitting having an axially movable, normally seated, valve therein; an engageable fitting having a chamber; an adjustable valve contacting member in said chamber; a stop for controlling the position of said member in said chamber, means for moving said stop to adjustably control the position of said member for effecting a predetermined opening of said valve; means for moving said member against said stop and urging said member to inoperative position; and means for locking said stop to retain said member in adjusted position.

5. In combination with a pipe fitting having a normally seated, axially movable, valve therein; and a chamber adjacent said valve; a diametrally arranged supporting bar in said chamber; a member mounted on said bar for contacting said valve to open the latter; a stop adjustable on said bar for controlling the movement of said member; and means for operating said stop and moving said member to adjustably position the latter transversely of said chamber to effect a determined opening of said valve.

6. In combination with a pipe coupling having an axially movable, normally seated, valve therein; an axially engageable coupling having a chamber; a supporting bar extending through the wall of said chamber; a valve operator mounted on said bar; a member movably mounted on said bar and operable to adjustably position said operator transversely of said chamber to determinedly open said valve upon engagement of said couplings: and cooperating means on said bar and said member for limiting the movement of the latter in one direction.

7. In combination with a pipe fitting provided with an axially movable, normally seated spherical valve and having a chamber adjacent said valve into which a portion of the latter projects; a bar extending transversely of said chamber; a disc movably mounted on said bar to peripherally engage the surface of said spherical valve; and means extending into said chamber for adjustably positioning said disc transversely thereof to determinedly open said valve by varied contact of the periphery of the latter with the spherical surface of said valve.

In testimony whereof, I affix my signature.

HARRY F. SHINDEL.